United States Patent

[11] 3,617,046

| [72] | Inventor | Thomas Sotonyi<br>Wuppertail-Barmen, Germany |
|------|----------|---------|
| [21] | Appl. No. | 851,255 |
| [22] | Filed | Aug. 19, 1969 |
| [45] | Patented | Nov. 2, 1971 |
| [73] | Assignee | Firma Wenicke & Co.<br>Dusseldorf-Eller, Germany |
| [32] | Priority | Aug. 21, 1968 |
| [33] | | Germany |
| [31] | | P 17 97 139.0 |

[54] DEVICE FOR THE GRIPPING OF AN EYEGLASS FRAME, IN PARTICULAR IN DEVICES FOR MAKING LENS TEMPLATES
10 Claims, 4 Drawing Figs.

[52] U.S. Cl. .................................................. 269/156, 269/254
[51] Int. Cl. .................................................. B25b 5/14
[50] Field of Search ........................................... 269/104, 152, 156, 254, 45

[56] References Cited
UNITED STATES PATENTS

| 1,454,688 | 5/1923 | Pollard ...................... | 269/254 X |
| 1,645,669 | 10/1927 | Stevenson ................ | 269/156 X |
| 2,316,355 | 4/1943 | Nesbit ...................... | 269/254 X |
| 2,471,103 | 5/1949 | Franks ...................... | 269/254 X |

Primary Examiner—William S. Lawson
Attorneys—James M. Heilman and Heilman and Heilman ABSTRACT: This invention relates to a device for the gripping of an eyeglass frame, in particular in devices for making lens templates, comprising a ram plunger or the like pressing one lens amount of the frame against an adjustable abutment edge or against two counterholders.

PATENTED NOV 2 1971 3,617,046
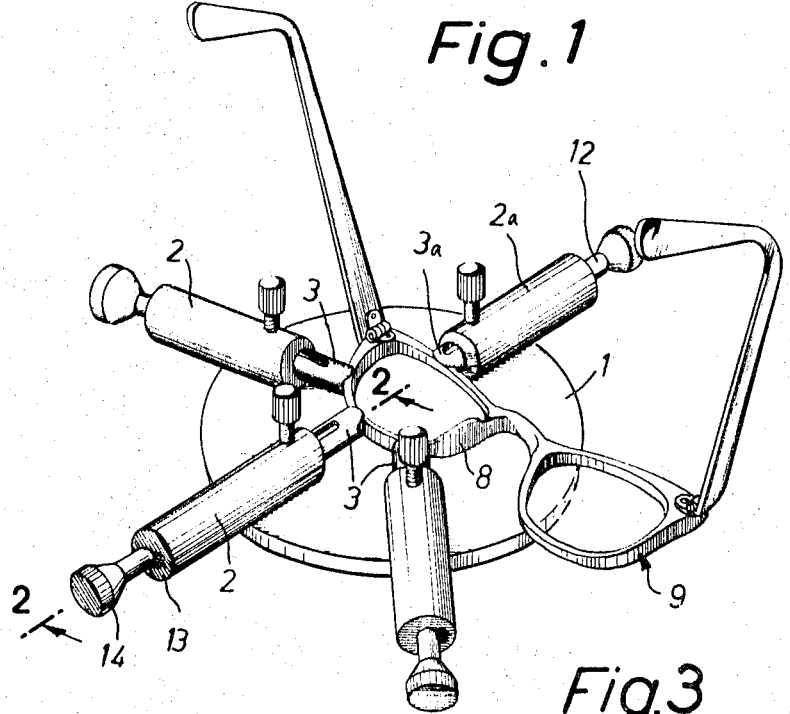
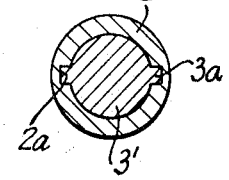 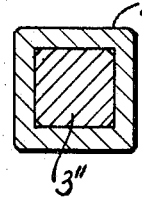
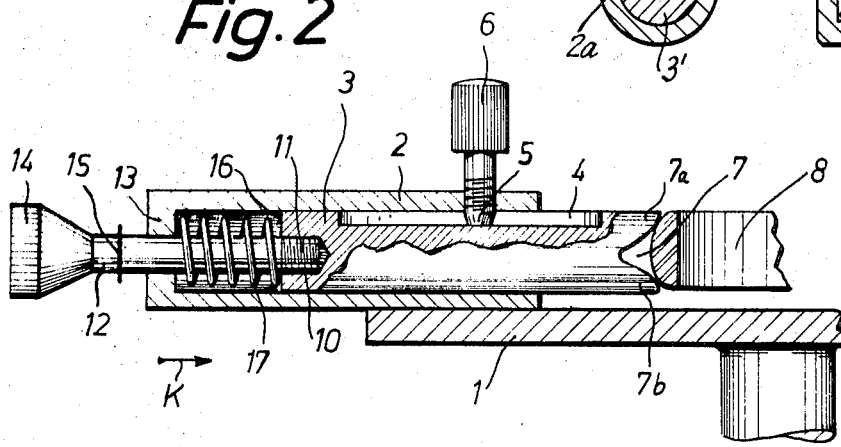
INVENTOR
Thomas Botony
BY
James M. Heilman
ATTORNEYS

DEVICE FOR THE GRIPPING OF AN EYEGLASS FRAME, IN PARTICULAR IN DEVICES FOR MAKING LENS TEMPLATES

This invention relates to a device for the gripping of an eyeglass frame, in particular in devices for making lens templates, comprising a ram plunger or the like pressing one lens mount of the frame against an adjustable abutment edge or against two counterholders.

In the devices of the mentioned kind known heretofore, it was necessary first to push the abutment edge or the two counterholders against the aligned lens mount whereupon the ram or plunger was then likewise brought to abut against the lens mount, and finally the edge, the counterholders, and the ram were fixed. Alternatively one could hold the abutment edge and the frame in both hands and displace both parts to center the corresponding lens mount or respectively to bring it into the desired position.

In the known devices, therefore, the frame must be held fast in the device, and with the second, free hand, the clamping device, e.g. a tightening screw, must be operated. This manipulation, too, is complicated and does not avoid the danger that during fixation of the frame the latter is shifted from its attained position, even if only slightly.

The invention has as its purpose to avoid the disadvantages of the hitherto known devices with simple means.

To achieve this purpose, the invention provides, in a device of the kind mentioned above, that the ram mounted elastically in its longitudinal direction has assigned to it on the side opposite the lens mount at least two likewise elastic rams, and all spring rams are so arranged, designed, and freely displaceable axially that the lens mount is movable in every radial direction and is held in the particular attained position by the spring action of all spring rams. The spring rams are preferably arranged in a sliding cylinder through which there projects a fixing screw for the ram.

In a variant of the invention the front end of each ram may have a beak-shaped notch for gripping the edge of the lens mount of the frame.

It is of particular advantage to make the spring force of the rams continuously variable. For this purpose the rear end of each ram may have a threaded bore into which there engages a threaded bolt which can be actuated from outside the cylinder and around which bolt the ram spring is wound.

In a further design of the invention, each ram may be arranged nonrotatably in its sliding cylinder. For this purpose the ram's surface adjacent the adjusting screw may have a notch or the like into which the tip of the adjusting screw projects. In the modification illustrated in FIG. 4, the ram 3'' and the internal cross section of the sliding cylinder 2'' are designed as a polygon, while in the modification shown in FIG. 3 the cylinder 2' is provided with a groove-type longitudinal guide 2a into which the flange 3a of ram 3' fits. Obviously, a fixing or adjusting screw 6 may be used in these modifications if desired.

The sliding cylinders are preferably arranged approximately in a circle on a rotatable support plate, which forms a part, for example, of the device for producing the lens template.

According to the invention, the sliding cylinders may be pivotable about a transverse shaft and fixable in the pivoted position. Thereby an additional adaption to the form of the lens mount can be achieved.

An embodiment of the invention is illustrated in the drawing, in which:

FIG. 1 shows a perspective view of the device, and

FIG. 2 a section through one of the rams and its sliding cylinder taken on the line 2-2 of FIG. 1.

FIG. 3 is a modified form showing a guide and groove arrangement of the rams and FIG. 4 is a further modification form showing polygonal configuration for the rams and cylinders.

On a support plate 1, which forms a part of a device for making lens templates, the plate being placeable on this device, sliding cylinders 2 are arranged in approximately circular arrangement. The cylinders may be pivotable about a shaft disposed normal to plate 1 or be firmly connected with plate 1. In the cylinders, rams 3 are displaceable in axial directions. These may be provided at the top with a groove 4, into which there engages the tip 5 of a fixing screw 6. By this adjusting screw and the groove 4 the ram becomes nonrotational, but is held shiftable in the sliding cylinder 2. Further, the ram 3 can be fixed in the sliding cylinder in an attained position by the fixing screw 6.

The front end of ram 3 carries a beak-type notch 7, in such a way that the two beak portions 7a and 7b rest in the manner of jaws against the outer wall of a lens mount 8 which forms part of the frame 9.

The rear end of ram 3 carries an inner thread 10, into which there engages the thread 11 of a threaded bolt or nut 12, the second end of which, projecting from the back wall 13 of the sliding cylinder 2, is provided with a knurled screw 14. The shank of the threaded bolt 12 may be provided with a ring 15, by which the movement of the threaded nut 12 in the direction of arrow K is limited, unless the knurled screw 14 takes over this function. Between the backwall 13 of the sliding cylinder 2 and the backwall 16 of the ram 3 a spring 17 is provided which winds around the threaded bolt 12 and presses the ram 3 in the direction of arrow K (FIG. 2).

The arrangement of the sliding cylinders 2 and of the rams 3 as well as the formation of the spring 17 insure that first the threaded bolt 12 of ram 3a is retracted from the cylinder 2a and then the lens mount 8 can be placed on plate 1 while at the same time pressing back the other rams with the lens mount. Thereupon the threaded nut 12 of ram 3a can be released whereby the spring of ram 3a provides that this ram also comes to abut against the lens mount 8.

Upon movement of frame 9 in any desired direction at least one of the rams 3 yields in axial direction while the other rams follow the mount, all rams remaining in abutment on the mount. If frame 9 is released, it will generally remain in its attained position, due to the sliding friction of the ram against the cylinder, the springs 17 being designed and arranged appropriately for that purpose. When the frame or respectively the mount 8 has attained the desired position, one or two fixing screws 6, preferably of adjacent rams, are tightened and thereby the corresponding rams are fixed in relation to their cylinders 2.

I claim:

1. A device for gripping an eyeglass frame having a lens mount, in particular in devices for making lens templates, comprising one spring actuated forcing ram on one side of the lens mount, a plurality of similar spring actuated forcing rams on the opposite side of the lens mount, each of said spring actuated forcing rams being slidably arranged in a cylinder, an adjusting screw for each of said rams projecting through each of said cylinders, the front end of each ram having beak-type notch for seizing the lens mount edge, and the spring force of the ram being continuously adjustable, a threaded bore in the rear end of each ram, a threaded bolt engageable in said bore and actuated from outside the sliding cylinder, and around which the ram spring is wound, whereby said lens mount is freely movable in a radial direction but is held in a particular attained position by the spring action of said forcing rams.

2. Device according to claim 1, characterized in that the ram surface adjacent the adjusting screw has a notch or the like into which the tip of the adjusting screw projects.

3. Device according to claim 1 in which the ram and the inner surface of the cylinder are in the form of polygons.

4. Device according to claim 1 in which the ram and cylinder are provided with longitudinal guides and grooves.

5. Device according to claim 2 characterized in that the sliding cylinders are arranged approximately on a circle on a rotatable support plate.

6. A device for gripping an eyeglass frame in order to make lens templates comprising a plurality of hollow cylinders radially disposed toward a central clamping area, a forcing ram in each cylinder, spring means also in each cylinder for urging the ram toward the clamping area, each of said rams formed with a notch at its exterior end for mechanically engaging a portion of the frame, a manually adjustable threaded rod engaging a threaded bore in the rear end of each ram for moving the ram within the cylinder, and an adjusting screw projecting through said cylinders for clamping the rams in a desired position.

7. A device as claimed in claim 6 wherein the ram surface adjacent to the adjusting screw is formed with a notch into which the tip of the adjusting screw projects.

8. A device as claimed in claim 6 wherein the ram and the inner surface of the cylinder are polygons.

9. A device as claimed in claim 6 wherein the ram and inner surface of the cylinders have cooperating guides and grooves.

10. A device as claimed in claim 6 wherein the sliding cylinders are arranged approximately in a circle on a rotatable support plate.